INVENTOR.
PHILLIP E. OUELLETTE
BY
ATTORNEYS

INVENTOR.
PHILLIP E. OUELLETTE
BY
Barnes, Kisselle, Raisch & Choate
ATTORNEYS

INVENTOR.
PHILLIP E. OUELLETTE

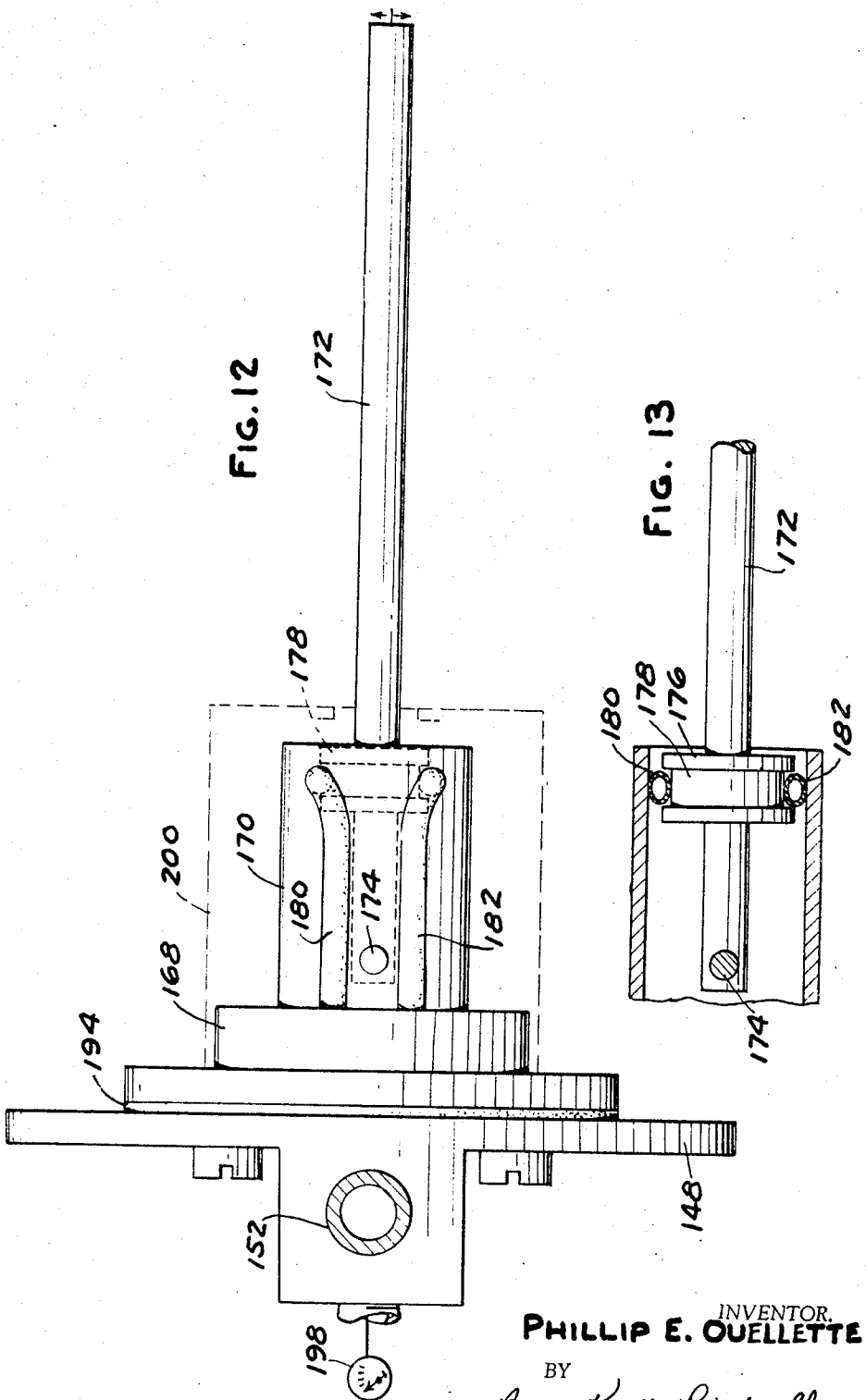

United States Patent Office 3,450,152
Patented June 17, 1969

3,450,152
FLUID PRESSURE OPERATED PROPORTIONING TRANSMITTER AND CONTROLLER
Phillip E. Ouellette, c/o Acrolab Instrument Co., Box 425, Walkerville P.O., Windsor, Ontario, Canada
Filed Feb. 20, 1967, Ser. No. 617,171
Int. Cl. G05b 11/44; F16k 31/34, 31/365
U.S. Cl. 137—414
8 Claims

ABSTRACT OF THE DISCLOSURE

A proportioning transmitter and controller of the fluid pressure operated type having a pair of flexible wall conduits connected at one end to a pressure chamber of the diaphragm type. Movement of the diaphragm in response to a change in pressure in the pressure chamber is adapted to actuate a member for controlling the value of an operating condition, such as temperature, pressure, etc. A device for sensing the value of the operating condition has a movable arm disposed between the two flexible conduits and arranged such that, when the movable arm moves in one direction, it restricts one of the conduits to a greater extent and the other conduit to a lesser extent and, when the movable arm moves in the opposite direction, the restriction in the two flexible conduits is reversed. One of the flexible conduits is connected to a source of fluid pressure and the other to exhaust.

---

This invention relates to a proportioning transmitter and controller of the fluid pressure operated type.

The controller and transmitter of the present invention is adapted for use in applications where it is desired to indicate and/or control a variable operating condition which is adapted to be sensed by a mechanical element that moves in response to variations in the operating condition. Such operating condition may take the form of the temperature of heated or air-conditioned space, pressure in a conduit or a chamber, the level of liquid in a container, etc. The transmitter and controller of this invention is adapted to sense a change in the operating condition and transmit such change as a fluid pressure signal to an indicator or to a device for effecting a corrective influence on the operating condition.

It is an object of the present invention to provide a device of the type described which is of simple and economical construction.

A further object of the invention is to provide a device of the type described which is subject to negligible wear and is inexpensive to maintain in operating condition.

Still another object of the invention resides in the provision of a device of the type described which functions equally well with air or gas as the operating fluid, which is self-cleaning in operation and which is relatively insensitive to impurities in the operating fluid.

In general the present invention comprises a signal transmitter wherein a change in a variable operating condition such as temperature, liquid level, pressure, current, etc. is sensed and transmitted as a proportional fluid pressure signal to an indicator or controller. The signal transmitter includes a pair of conduits having flexible wall portions which are engaged by a movable member actuated by the sensing device such that movement of the movable member in response to a change in the operating condition simultaneously restricts the passageway in one conduit to a greater extent and restricts the passageway in the other conduit to a lesser extent. At one end both conduits are connected to a pressure chamber which includes a pressure sensing element which moves in response to a change in pressure in the pressure chamber. The pressure sensitive element may be in the form of an indicator for simply indicating the value of the operating condition but preferably comprises a controller for operating a device adapted to produce a corrective influence on the operating condition. The other ends of the two conduits are connected one to a source of fluid under constant pressure and the other to exhaust. Thus, movement of the movable member of the sensing device produces a proportional change in pressure in the pressure chamber. This change in pressure is transmitted by a pressure sensing element to an indicator or to an indicator and a device for producing a change in the operating condition.

used to control current to an electrically operated device.

Figure 5:
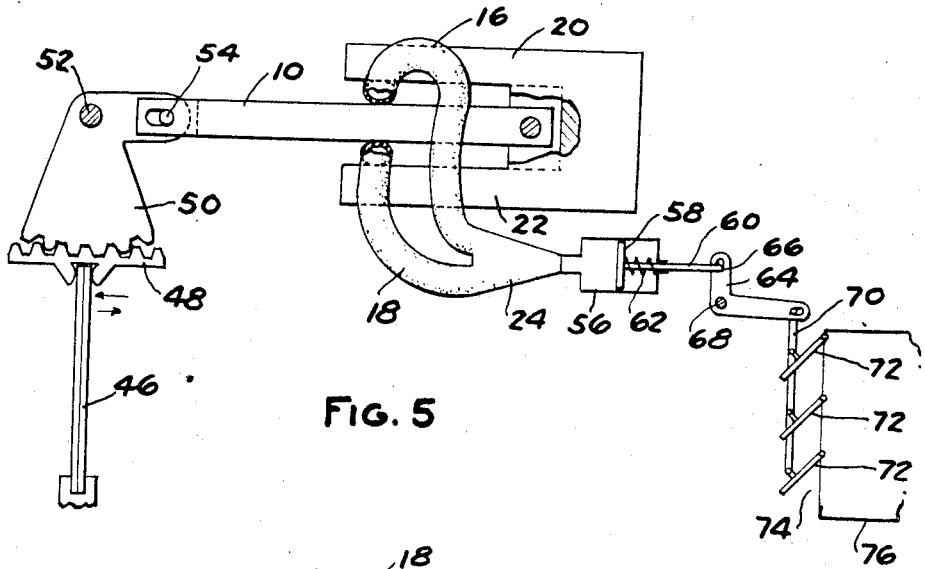

FIGURE 5 shows the device of the present invention used for controlling the temperature of a heated or air-conditioned enclosure.

Figure 6:
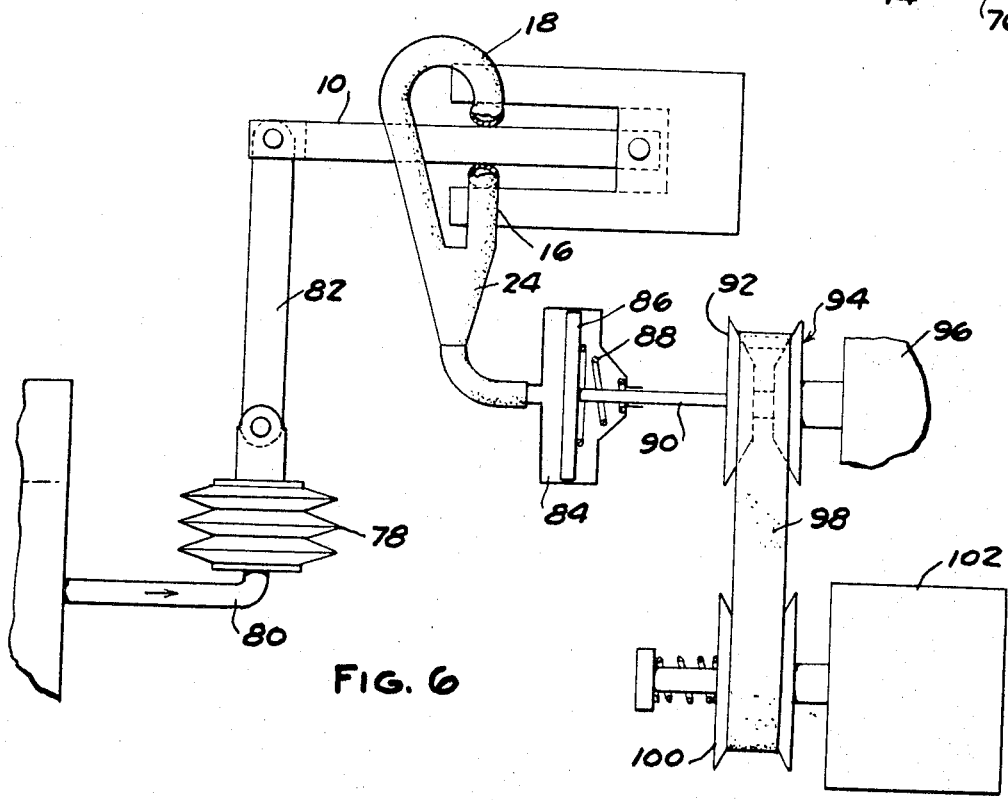

FIGURE 6 shows the device of the present invention used for controlling the pressure supplied to a pressure operated device.

Figure 7:
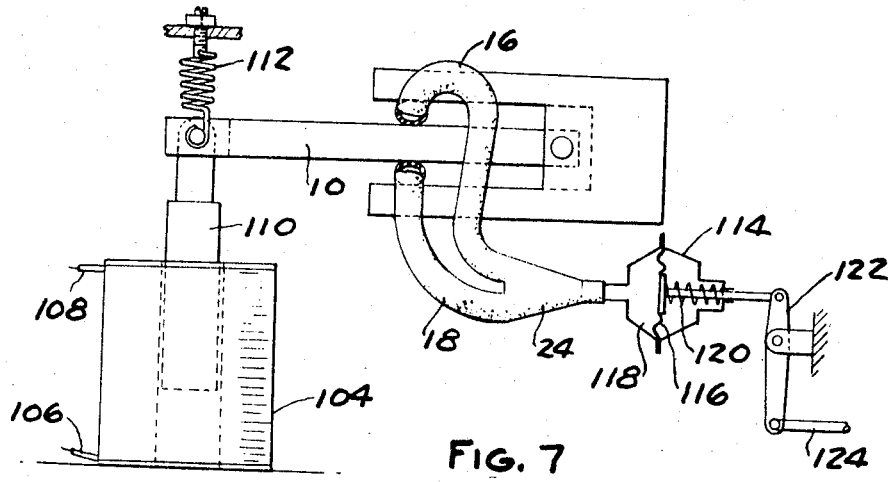

FIGURE 7 shows a device of the present invention used to control current to an electrically operated device.

Figure 8:
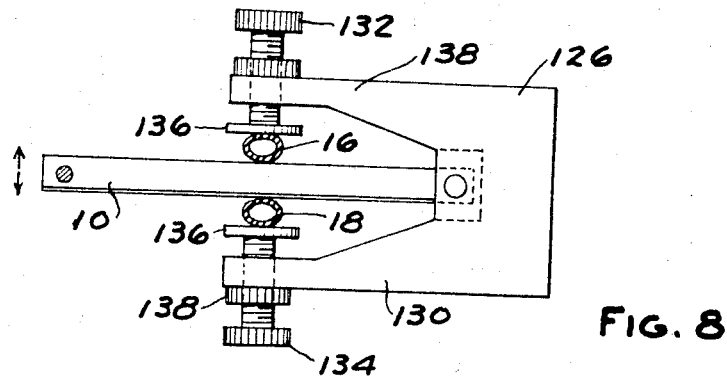

FIGURE 8 shows a modification of the general arrangement of the device.

Figure 9:
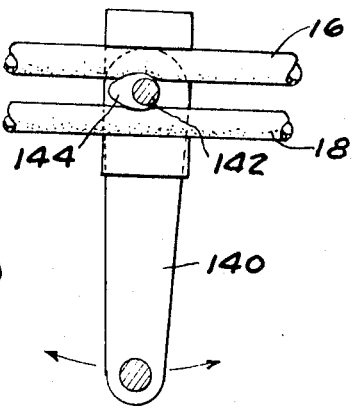

FIGURE 9 shows a second modification of the general arrangement of the device.

Figure 10:
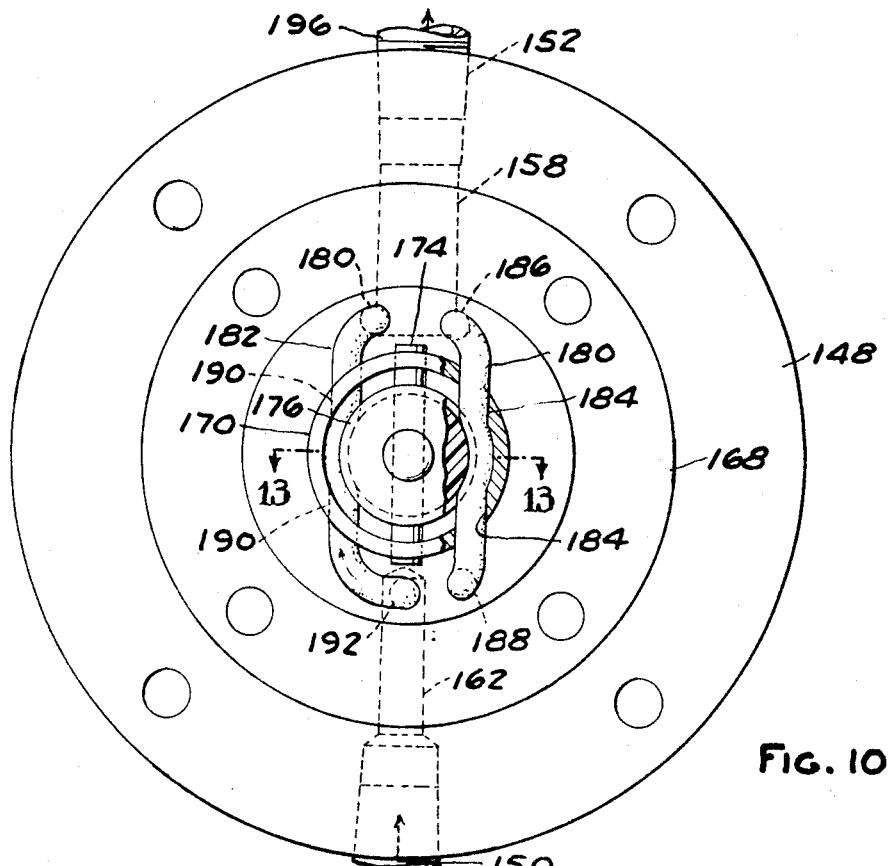

FIGURE 10 is an end view, partly in section, of a specific embodiment of the device.

Figure 11:
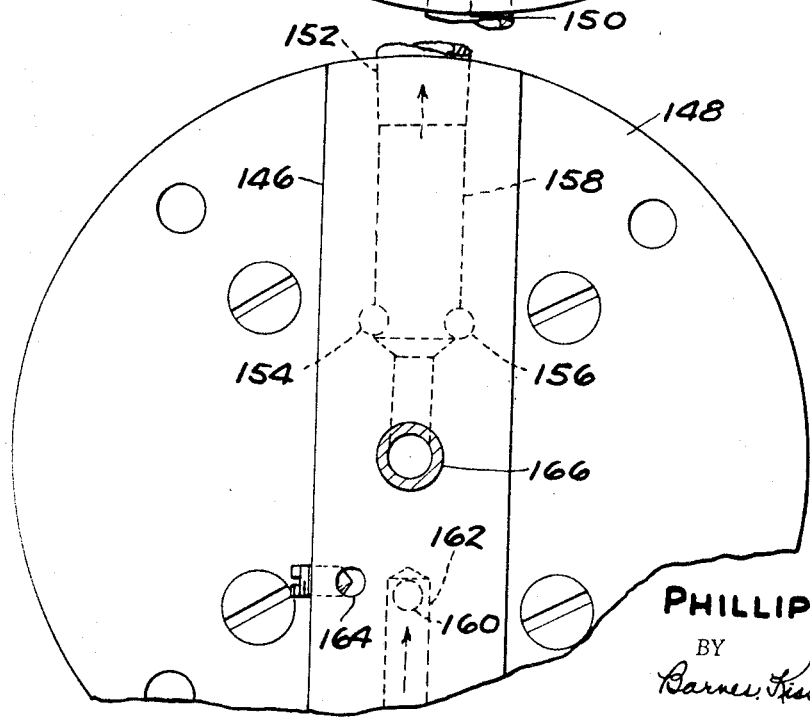

FIGURE 11 is an end view of the device shown in FIG. 10 as viewed from the opposite end thereof.

FIGURE 12 is a side elevational view of the device shown in FIGS. 10 and 11.

FIGURE 13 is a fragmentary sectional view taken along the line 13—13 in FIG. 10.

In FIGS. 1 through 4 the general principle of construction and operation of the transmitter and controller of the present invention is illustrated. The device incudes a lever 10 pivotally mounted as at 12 on a support 14. Lever 10 is adapted to be connected with a sensing device for sensing the value of an operating condition. For example, if the operating condition to be indicated or controlled is temperature, then lever 10 would be connected with a thermostatic bimetal element. For example, if the operating condition to be indicated is liquid level, then lever 10 would be connected with a float.

Figure 1:
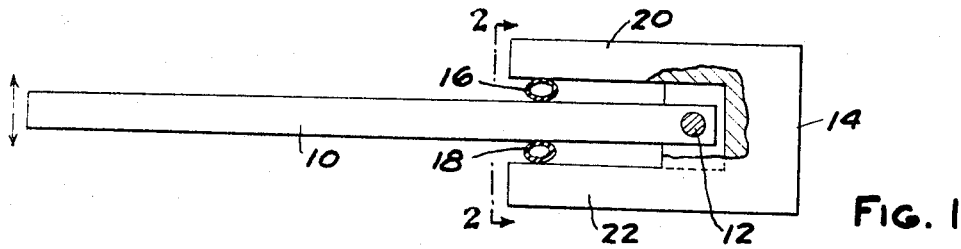
FIGURE 1 is a sectional view, somewhat schematic, of a transmitter and controller according to the present invention.
Figure 2:
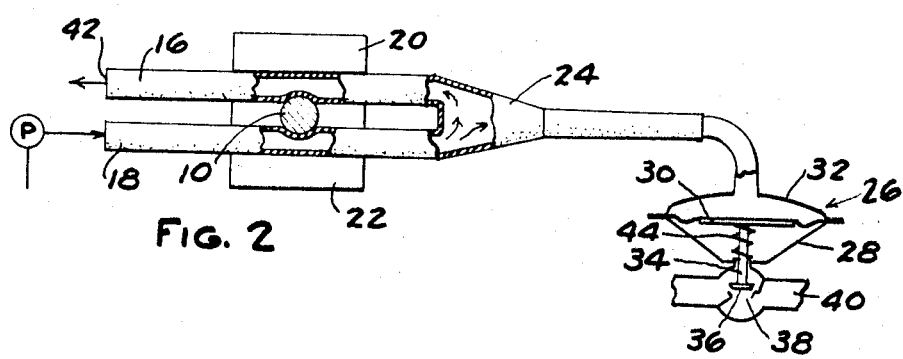
FIGURE 2 is a sectional view along the line 2—2 in FIG. 1 and showing the device when the operating condition is at the predetermined mean value.

The device also includes a pair of conduits 16, 18. These conduits are preferably formed of rubber but may be formed of any flexible material so that the wall thereof is distortable. In the arrangement shown, support 14 is fashioned with a pair of spaced arms 20, 22 between which lever 10 extends. Tube 16 is arranged between the upper side of lever 10 and arm 20 and tube 18 is arranged between the lower side of lever 10 and arm 22. The spacing of arms 20, 22 is correlated to the transverse dimension of lever 10 and of tubes 16, 18 so that in a central or a mean position both tubes 16, 18 are distorted slightly by lever 10 as shown in FIG. 2. Tubes 16, 18 at one end communicate with a common outlet 24 which in turn extends to a pressure sensing device 26.

Figure 3:
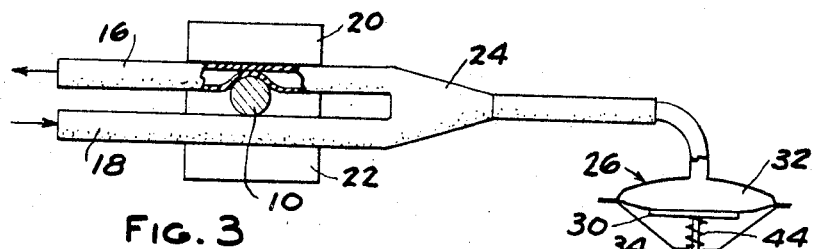
FIGURES 3 and 4 are views similar to FIG. 2 and showing the device when the operating condition assumes oppositely extreme values.
Figure 4:
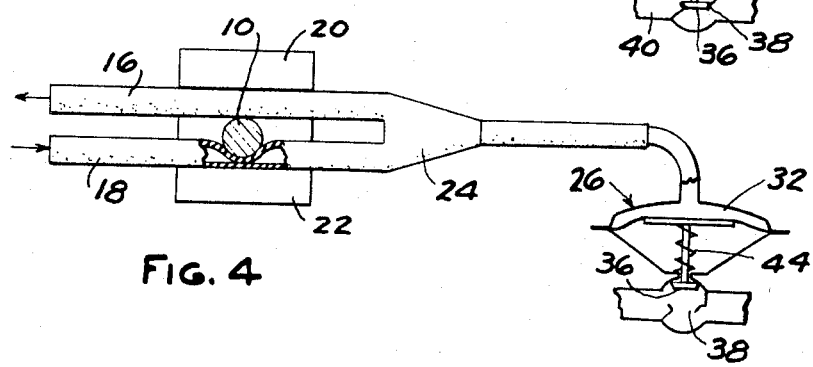

In the arrangement illustrated in FIGS. 2-4 the pressure sensing device 26 is in the form of a housing 28 containing a movable diaphragm 30 which forms with the housing 28 a pressure chamber 32 which communicates with common outlet 24. On the lower side of diaphragm 30 there is mounted a stem 34 which supports a valve 36 adapted to variably open and to close valve port 38 in a conduit 40. Conduit 40 forms a passageway having pressurized fluid which may be a liquid or a gas and valve 36 is adapted to variably restrict valve port 38 and thereby control the flow of fluid through conduit 40.

The opposite end of conduit 18 is adapted to be supplied with fluid at constant pressure. In FIG. 2 the pressure supplying means is designated P. The fluid may be either liquid or a gas. The other end of conduit 16 comprises a bleed or an exhaust outlet 42.

With the above described arrangement it will be noted that lever 10 is movable between two extreme positions shown in FIGS. 3 and 4. In FIG. 3 lever 10 has pivoted upwardly to a position wherein conduit 16 is completely closed and conduit 18 is unrestricted. If lever 10 were connected with a float in a liquid container, in the position shown in FIG. 3, the float will have assumed a position above the mean level of liquid desired in the container. Thus, neglecting friction of the tube walls, the pressure in the common outlet 24 and in the pressure chamber 32 would be approximately equal to the pressure P. The system is so designed that under this condition the spring 44 on the underside of diaphragm 30 is compressed to an extent sufficient to cause valve 36 to completely close port 38 and thus completely stop the flow of fluid in conduit 40. In this arrangement conduit 40 could extend from a source of liquid to the container, the level of which is being controlled. Thus, if the level of liquid in the container exceeds the desired mean value to an extent such that lever 10 assumes the position shown in FIG. 3, the flow of liquid to the container through conduit 40 would be completely shut off until such time as the level in the container dropped to an extent permitting lever 10 to pivot downwardly. On the other hand, if the liquid in the container was at any moment being discharged at a rate substantially greater than that supplied by conduit 40, then the level of liquid therein would drop to an extent such as to cause lever 10 to assume its lowermost position in which case conduit 18 would be completely restricted. In this event, the pressure in chamber 32 would drop to a minimum value allowing spring 44 to lift valve 36 to the wide-open position and thereby permitting maximum flow of liquid through port 38.

In positions of lever 10 intermediate those shown in FIGS. 3 and 4 the two conduits 16, 18 would be variably restricted and would, accordingly, control the extent to which valve 36 opened port 38. For example, the condition of the device shown in FIG. 2 indicates that the level of liquid in the container is at the desired mean value. Under these conditions conduits 16, 18 are equally restricted by lever 10 and the pressure obtained in chamber 32 is just sufficient to maintain valve 36 in a mean position wherein the quantity of liquid supplied to the container is equal to the quantity of liquid being discharged from the container. If the liquid level dropped slightly from the desired mean value, lever 10 would pivot downwardly a slight extent causing a greater restriction in conduit 18 than in conduit 16. This would cause a slight drop in pressure in chamber 32 and consequently cause spring 44 to shift valve 36 slightly upwardly from the position shown in FIG. 2 to enable a greater quantity of liquid to flow from the liquid source to the container. On the other hand, if liquid was being exhausted from the container at a rate slightly less than the rate at which liquid is supplied to it by conduit 40, the float connected to lever 10 would rise slightly causing a greater restriction in conduit 16 than in conduit 18. Under the latter condition the pressure in chamber 32 would rise slightly, causing valve 36 to advance toward port 38 and thus diminish the flow through conduit 40 to the container. With this arrangement the mechanical movement of lever 10 is always transmitted as a proportional fluid pressure signal to chamber 32 and, thus, the pressure sensitive element in chamber 32 always moves in proportion to the movement of lever 10.

In FIGS. 5 through 7 there are illustrated various typical applications of the transmitter and controller of this invention. In FIG. 5 the device is shown for controlling the temperature of a heated or air-conditioned space. Thus, in this arrangement a thermostatic bimetal element 46 in the temperature controlled space carries a rack portion 48 which engages with a gear sector 50 pivotally supported as at 52. Gear sector 50 has a crank arm pivotally connected to lever 10 as at 54. In this arrangement the common outlet 24 from the two conduits 16, 18 extends to a cylinder 56 in which a piston 58 is slidably arranged. Piston 58 is mounted on a rod 60 which is biased by a spring 62 and connected with one arm of a bell crank 64 as at 66. Crank 64 is pivotally supported at 68 and the other arm thereof is connected by linkage 70 with a plurality of vanes 72 controlling the outlet of an air duct 76.

Assuming that the device illustrated in FIG. 5 is used in conjunction with an air-conditioning unit wherein the cold air is admitted to the air-conditioned space through the outlet opening 74, the arrangement is such that when the temperature in the air-conditioned space falls below a predetermined mean value, bimetal element 46 flexes to the right from the neutral position shown in FIG. 5. This causes lever 10 to swing upwardly, thus increasing the restriction in conduit 16 and increasing the pressure in cylinder 56. This in turn causes piston 58 to shift to the right which rotates bell crank 64 clockwise and causes vanes 72 to reduce the effective size of outlet 74 on duct 76. Thus less refrigerated air is admitted to the enclosure and the temperature will therefore gradually rise. As the temperature rises, bimetal element 46 will tend to flex back toward the neutral position and thereby equalize the restriction in conduits 16 and 18 when the predetermined mean temperature is reached.

In the arrangement shown in FIG. 6 the transmitter and controller is illustrated for controlling fluid pressure, either air or liquid, in a fluid pressure system. In this arrangement, the system in which the fluid pressure is controlled contains an expansible bellows 78 to which the pressurized fluid is conducted through an inlet 80. Bellows 78 is adapted to expand and retract vertically in response to the pressure obtaining therein. Bellows 78 is connected by a link 82 with lever 10 so that as the pressure in the system increases and decreases lever 10 is pivoted upwardly and downwardly, respectively. The common outlet 24 of the two flexible conduits 16, 18 communicates with a cylinder 84 containing a piston or diaphragm 86 which is biased by a spring 88. Piston 86 is fixedly mounted on a rod 90 which carries one section 92 of a variable speed pulley 94 driven by a motor 96. Pulley 94 is connected by a belt 98 with a second self-adjusting pulley 100 which drives a pump 102. Pump 102 supplies the pressurized fluid for the system with which bellows 78 communicates.

With the arrangement shown in FIG. 6, when the pressure in the system exceeds the predetermined mean value, bellows 78 expands, thus pivoting lever 10 upwardly and producing a greater restriction in conduit 18 and a lesser restriction in conduit 16. Since conduit 18 is connected with the source of constant pressure fluid, the pressure in cylinder 84 will drop thus enabling spring 88 to shift piston 86 to the left. This in turn increases the spacing between the two half sections of pulley 94 and reduces the speed of operation of pump 102. A reduction in speed of pump 102 will decrease the pressure generated in the fluid pressure system being controlled and bellows 78 will respond by contracting until a point is reached where the pressure in the system reaches the predetermined mean value.

In FIG. 7 the device of the present invention is illustrated for controlling current to an electrically energized device. In the circuit of the electrically energized device there is arranged a solenoid 104 which is connected in the circuit by leads 106, 108. An armature 110 is associated with solenoid 104 and is pivotally connected to lever 10. Armature 110 is biased upwardly by a calibrated spring 112. The common outlet 24 is connected to a housing 114 which contains a diaphragm 116 forming a pressure chamber 118. Diaphragm 116 is biased by a spring 120 and is connected to one end of a lever 122. The other end of lever 122 is connected to a rod 124 which actuates a current-limiting device, such as a rheostat or the like, for increasing or decreasing the resistance in the circuit to the electrical device.

When the current to solenoid 104 increases above the desired predetermined mean value, armature 110 is drawn inwardly of the solenoid against the tension of spring 112 and pivots lever 10 downwardly. This causes a greater restriction in one of the conduits 16, 18 and a lesser restriction in the other. Thus, the pressure in chamber 118 is caused to increase or decrease and diaphragm 116 is shifted in one direction or the other from the position illustrated in FIG. 7. Displacement of diaphragm 116 in turn causes actuation of rod 124 which is designed to exert a corrective influence in the form of increased or decreased resistance in the circuit being controlled.

In each of the above described arrangements the extent to which the pressure in the common outlet 24 and the pressure chamber connected therewith is increased or decreased is proportional to the extent to which the lever 10 is displaced. Thus, the mechanical movement of lever 10 is converted into a proportional fluid pressure signal to the controlling device. In each instance the conversion of a mechanical movement into a proportional fluid pressure change is achieved by simply increasing the restriction of one of the conduits 16, 18 and correspondingly reducing the restriction in the other conduit.

FIG. 8 illustrates a modified arrangement for supporting conduits 16, 18. In FIG. 8 the conduit support 126 is fashioned with upper and lower arms 128, 130, the free ends of which are threaded to receive opposed adjusting screws 132, 134. Each adjusting screw has a flat disc portion 136 for engaging the respective conduit and a lock nut 138. With this arrangement the two screws 132, 134 may be individually adjusted to produce the desired degree of restriction in each conduit 16, 18 when the lever 10 is in the desired mean position. In this manner the pressure in the pressure chamber to which the common outlet 24 is connected can be adjusted as desired in relation to the supply pressure to conduit 18 and in relation to the energy required to displace the pressure sensitive element in the pressure chamber.

In FIG. 9 a modified arrangement is shown for variably restricting the two conduits 16, 18 in response to changes in the operating condition being controlled. In this arrangement the sensing device for the operating condition comprises a lever 140 which is pivotally supported at 142 so as to swing in opposite directions in response to variations of the operating condition from the desired mean value. Lever 140 forms a crank having a cam 144 thereon which is disposed between the two conduits. In the arrangement illustrated in FIG. 9, when lever 140 rotates in a clockwise direction, conduit 16 is restricted to a greater extent and conduit 18 is restricted to a lesser extent. Likewise, when lever 140 is pivoted about the axis 142 in a counter-clockwise direction, conduit 18 is restricted to a greater extent and conduit 16 is restricted to a lesser extent.

In FIGS. 10 through 13 there is illustrated a specific form of transmitter and controller of the present invention. The embodiment illustrated includes a manifold 146 formed with a face or mounting plate 148 at one side thereof. Manifold 146 is formed with an inlet port 150 at one end and an outlet port 152 at its opposite end. The side of face plate 148 opposite manifold 146 has a pair of holes 154, 156 therein which communicate with the outlet port 152. It is also provided with a drilled hole 160 which communicates with the inlet passageway 162 extending from inlet port 150. Face plate 148 is also provided with a drilled hole 164 which extends directly through manifold 146 and serves as a bleed or exhaust port. Manifold 146 is fashioned with a threaded gage port 166 that communicates at its inner end with outlet passageway 158.

There is bolted on face plate 148 a bracket 168 having a cylindrical hollow extension 170 extending axially therefrom. Within extension 170 there is pivoted a sensing rod 172 which corresponds to the lever 10 previously described. Rod 172 is pivoted on extension 170 as by a pin 174. Adjacent the free end of extension 170 there is fixed on rod 172 a collar 176 having a channel-shaped peripheral groove 178. The groove 178 is adapted to receive flexible conduits 180, 182. These conduits correspond to the previously described conduits 16, 18. The central intermediate portion of conduit 180 extends around one side of collar 176 and projects outwardly through openings 184 in extension 170 (FIG. 10). One end of conduit 180 extends into a hole 186 in bracket 168 which communicates with opening 154 in face plate 148. The other end of conduit 180 extends through an opening 188 in bracket 168 which communicates with the bleed or exhaust port 164 in face plate 148. The other conduit 182 has its intermediate portion extending around the other side of collar 176 and projecting through openings 190 in extension 170. One end of conduit 182 extends through the other opening 186 in bracket 168 that communicates with the opening 156 in face plate 148. The other end of conduit 182 extends through an opening 192 in bracket 168 which communicates with opening 160 in face plate 148. The ends of conduits 180, 182 are sealed within their respective openings in bracket 168 and bracket 168 is in turn sealed against face plate 148 by means of a gasket 194.

The inner diameter of extension 170 is related to the diameter of conduits 180, 182 and the diameter of groove 178 so that when rod 172 is in a central position both conduits are slightly compressed as shown in FIG. 13. Thus, if rod 172 pivots in response to variations in the operating condition being controlled, the restriction in one of the conduits is increased and the restriction in the other conduit is decreased.

In this arrangement the common outlet conduit 196 is connected to the outlet port at one end and to the pressure responsive chamber of the pressure sensing device at its other end. A gage 198 may be connected with port 166 so that the pressure at the outlet port can be indicated directly. If desired, a cover 200 may be telescoped over extension 170.

The internal passageways of conduits 16, 18 should be sufficiently large to avoid an orifice effect on the pressure fluid but should not be so large as to require an unreasonably high pressure at the fluid pressure source P. Rubber tubes having an outer diameter of about 1/8″ and an inner diameter of about 1/16″ have performed very satisfactorily in this arrangement when the operating fluid was compressed air. It should be appreciated, however, that the operating fluid can be a liquid if desired. Regardless of whether the operating fluid is a gas or liquid, the device functions equally well and is substantially insensitive to impurities in the operating fluid, such as dust, dirt, etc., as would be the case in a valve type controller.

The overall arrangement is very economical both from the standpoint of cost and maintenance. There is no negligible wear on the parts of the device; it is insensitive to rough treatment and is inherently self-cleaning. It can easily be designed for extremely high operating pressures or relatively low operating pressures depending on the application to which it is put. Furthermore, the connections on the tubes can be readily reversed depending on the application which the unit is used. For example, referring to FIG. 2 the pressure fluid can be directed to conduit 16 in which case conduit 18 is the bleed or exhaust conduit.

I claim:

1. A proportioning signal transmitter or controller comprising a pair of conduits each having a flexible wall, means mounting the conduits in a predetermined spaced relation, said conduits being in open communication at one end thereof with a pressure chamber containing a pressure responsive element which is adapted to be displaced in response to pressure variations in said chamber, a sensing device having an actuating member movable in response to a change in a variable operating condition and adapted to be displaced an amount proportional to the extent of said change, said member engaging said two conduits so as to variably distort the wall of either or both of the conduits and thereby correspondingly variably restrict the passageway therein, said member when moved simultaneously increasing the restriction in one of said conduits and decreasing the restriction in the other conduit in proportion to said change in said operating condition, said member assuming a position in response to a mean value of said operating condition wherein it only partially restricts both of said conduits, means for supplying fluid at a constant pressure to the other end of one of said conduits and for exhausting said fluid from the other end of the other conduit whereby, when said actuating member moves in a direction to increase the restriction in said one conduit in response to a change in said operating condition, the pressure in said pressure chamber is reduced proportionately to the displacement of said actuating member and, when said actuating member is moved to increase the restriction in the other conduit in response to a change in said operating condition, the pressure in said pressure chamber is increased proportionately to the displacement of said actuating member and the pressure sensitive element is correspondingly moved in opposite directions proportionately to the magnitude of the changes in said operating condition.

2. A transmitter or controller as called for in claim 1 including means operated by said pressure responsive element for effecting a corrective influence on said operating condition to restore the operating condition to a predetermined desired value.

3. A transmitter or controller as called for in claim 2 wherein said member of the sensing device is disposed such that said predetermined value of said operating condition is established when the restriction in one conduit is substantially equal to the restriction in the other conduit.

4. A transmitter or controller as called for in claim 1 wherein said member of the sensing device extends between said conduits and has a transverse dimension greater than the spacing between the conduits.

5. A transmitter or controller as called for in claim 4 wherein said member of the sensing device is pivotally supported for movement in a plane extending transversely of said conduits.

6. A transmitter or controller as called for in claim 4 wherein said member of the sensing device comprises a cam rotatably supported between the two conduits.

7. A transmitter or controller as called for in claim 1 wherein said member of the sensing device is movable from a first position wherein the passageway in one of the conduits is substantially completely closed to a second position wherein the passageway in the other conduit is substantially completely closed.

8. The transmitter or controller called for in claim 1 wherein the movable member of the sensing device moves in opposite directions in response to changes in said operating condition above and below a predetermined mean value and wherein the pressure responsive element moves in opposite directions in response to movement of said movable member in opposite directions.

References Cited

UNITED STATES PATENTS

| 412,013 | 10/1889 | Beebe | 251—9 X |
| 1,208,274 | 12/1916 | Besler | 137—451 |
| 2,060,723 | 10/1936 | Brisacher | 137—413 |
| 2,339,469 | 1/1944 | Emanuel | 137—414 |
| 2,944,562 | 7/1960 | Glasgow et al. | 137—414 X |
| 3,075,551 | 1/1963 | Smith et al. | 251—7 X |

GEORGE F. MAUTZ, Primary Examiner.

U.S. Cl. X.R.

91—443; 137—436; 236—85; 251—5, 9